Patented Apr. 15, 1952

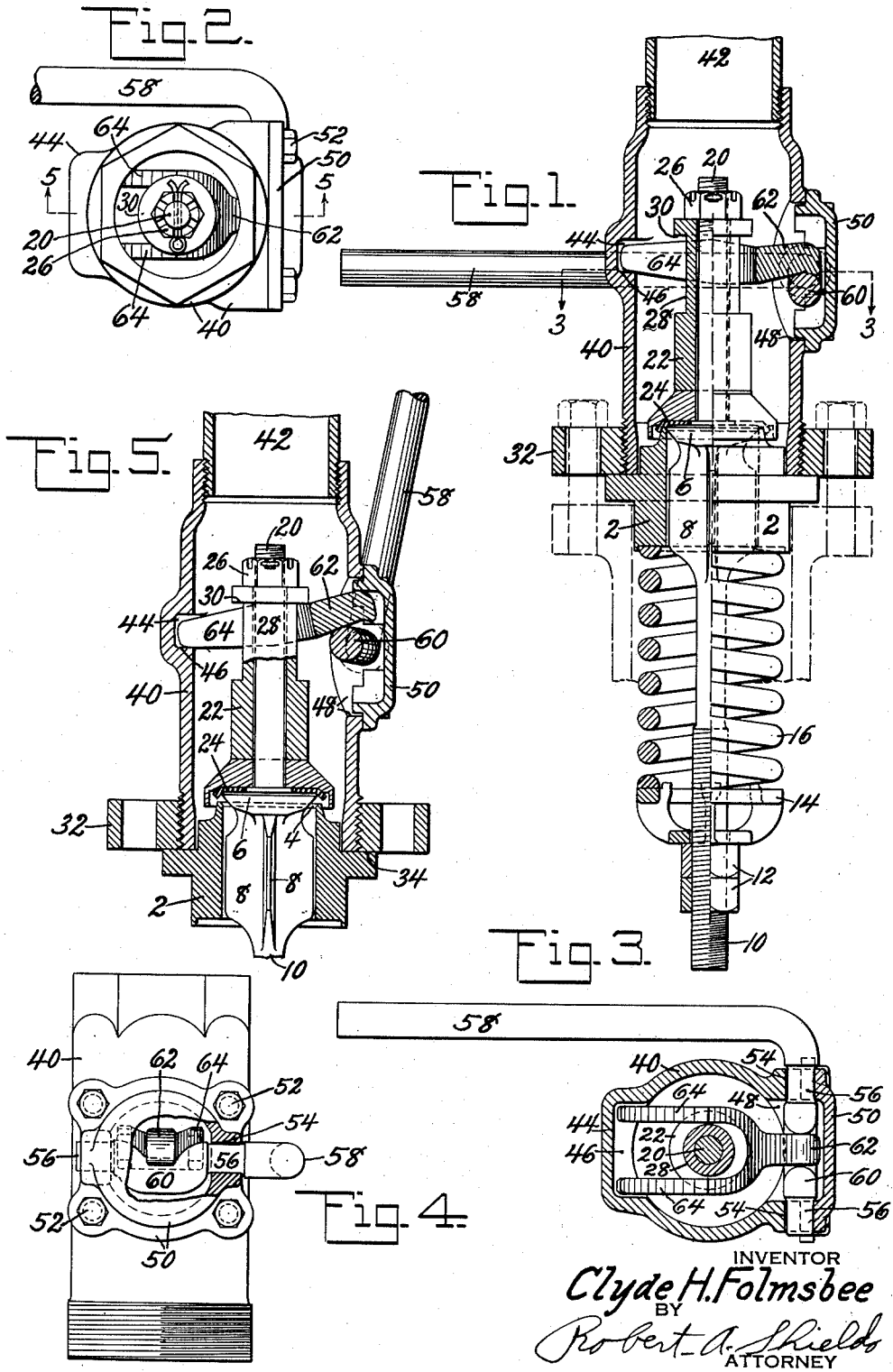

2,592,673

UNITED STATES PATENT OFFICE 2,592,673

SAFETY VALVE

Clyde H. Folmsbee, Bloomsburg, Pa., assignor to American Car and Foundry Company, New York, N. Y., a corporation of New Jersey Application July 11, 1945, Serial No. 604,309

6 Claims. (Cl. 137—53)

This invention relates to safety valves in general and in particular to safety valves which are used in a service requiring frequent testing of the valves. Safety valves which are applied to pressure vessels containing any substance likely to cause corrosion of the valve seat or stem must be frequently lifted in order to guarantee that they will function properly in case of emergency. In the past safety valves have been made with more or less integral lift devices which necessitates the maintenance of relatively large stores of valves, some having lift devices and some without lift devices. Occasionally valves which have been furnished without lift devices are later required to have lift devices due to change of service conditions or safety regulations. It is an object, therefore, of the present invention to provide a safety valve which can be used either with or without a lift device and without maintaining a large stock of parts.

A further object of the invention is the provision of a safety valve lift device which can be readily applied to existing valves and with a minimum amount of labor.

A still further object of the invention is the provision of a safety valve lift device which can be readily inserted in the exhaust stack leading from a safety valve.

These and other objects of the invention will be apparent to persons skilled in the art from a study of the following description and accompanying drawings, in which:

Fig. 1 is an elevational view partly in section of the improved safety valve and lift device;

Fig. 2 is a plan view of the construction;

Fig. 3 is a sectional view taken substantially on line 3—3 of Fig. 1;

Fig. 4 is a side elevational view with parts broken away to better disclose the construction, and Fig. 5 is a sectional view taken substantially on line 5—5 of Fig. 2 and showing the valve in lifted or unseated position.

Referring now to the drawings in detail it will be seen that the safety valve itself consists of a body portion 2 adapted to be screwed or clamped to the vessel structure and being provided with a central bore or opening and a valve seat 4. The valve seat 4 is adapted to be engaged by the valve 6 having preferably formed integral therewith guide wings 8 and lower stem 10. The lower stem is threaded to receive adjusting nuts 12 retaining a support member 14 in position to be engaged by the lower end of spring 16, the upper end of which engages the valve body 2. The spring thus urges the valve into engagement with the seat of the valve body. The valve is also provided with an upper stem 20 adapted to receive a sleeve 22 bearing at its lower end upon a gasket 24. This gasket is preferably of resilient material and is tightly clamped between the sleeve 22 and the valve 6 and engages the edge of the valve seat so as to effectively prevent leakage. The clamping of the gasket, or its removal in case of damage, can be effected by removing nut 26 threaded on the upper end of stem 20. As clearly shown, the sleeve 22 is provided with an elongated portion 28 of reduced diameter, thereby producing a shoulder 30.

As clearly shown in the drawings, the valve body is clamped in position on the vessel by means of an annular ring 32 bearing upon an outstanding shoulder 34 of the valve body 2. The inner surface of the annular ring is threaded to engage the lower threaded end of a lift body 40, the upper end of which is threaded or otherwise formed to engage the discharge stack pipe 42. The lift body is provided with a projection 44 internally recessed to provide the ledge 46. Diametrically opposite from the projection and ledge the body is formed with an opening 48 adapted to be closed by a cap 50 held in position by cap bolts 52. The sides of opening 48 and corresponding edges of cap 50 are provided with semi-circular recesses providing when assembled circular openings 54 adapted to receive the circular bearing portions 56 of a lift handle. The lift handle is of general angular form, having a hand grip portion 58 and an offset or crank portion 60 which is located between the cylindrical bearing portions 56. This offset or crank portion is adapted to engage beneath the leg 62 of a Y-shaped member, having the spaced arms 64 thereof straddling the reduced portion of sleeve 22 and with the ends projecting into the recessed projection 44 so as to bear upon the ledge 46. The arms 64 are normally free of engagement with the sleeve 22 but when rocked upwardly they will come into engagement with the shoulder 30 of the sleeve member. Thus it will be seen that a leverage of the second class is provided, with the power being applied to the lifting member of Y shape by a power multiplying means consisting of the lift handle and crank portion 60.

If for any reason the lift device is not required, the Y-shaped element may be removed by removing cap 50, after which a plain rod or the operating handle itself may be inserted in openings 54 and the cap fastened back in place, or, if desired, the entire lift assembly, including the body 40, can be removed and stack 42 directly connected to the clamping ring 32. In other words, a large number of parts need no longer be stocked since the valve can be supplied readily either with or without the lift device and the lift device itself can be furnished for application to existing structures. For example, the lift device can be readily applied to the structures of Patents 1,774,690 and 1,665,394 without requiring any extensive alteration in either the lift device or the valve structure.

While the construction has been described more or less in detail with specific reference to the drawings, it will be understood that modifications and rearrangements may be made without departing from the scope of the invention as defined by the following claims.

What is claimed is:

1. In a safety valve adapted to be secured to a pressure vessel, the combination of a valve body having a valve seat, a valve resiliently urged onto said valve seat by spring means located on one side of the valve seat, a projecting valve stem located on the opposite side of said valve from said spring means, a housing surrounding said projecting valve stem, a Y-shaped lift member disposed within said housing and free of attachment thereto, said lift member having the arms thereof in engagement with said valve stem, and operating means engaging the leg of said Y-shaped lift member to move the same and lift said valve off the valve seat.

2. In a safety valve adapted to be secured to a pressure vessel, the combination of a valve body having a valve seat, a valve resiliently urged onto said valve seat, a projecting valve stem, a housing surrounding said projecting valve stem, a ledge formed on the interior of said housing, a Y-shaped lift member disposed within said housing and having the arms thereof straddling said valve stem and resting on said ledge but free of attachment thereto whereby said lift member may freely shift relative to said ledge, a cranked shaft journaled in said housing and engaging the leg of said Y-shaped lift member, and means connected to said cranked shaft for causing movement thereof whereby said valve will be lifted off the valve seat.

3. In a safety valve adapted to be secured to a pressure vessel, the combination of a valve body having a valve seat, a valve resiliently urged onto said valve seat, a projecting valve stem, a housing surrounding said projecting valve stem, an opening formed in the side of said housing, a cap closing said opening, a cranked shaft journaled in said housing and retained in position by said cap, a ledge formed on the inside of said housing opposite to said opening, a Y-shaped lift member disposed in the housing with the arm and leg extremities engaging said ledge and cranked shaft respectively but free of attachment thereto whereby said lift member may freely shift relative to said housing and valve stem, said lift member having the arms straddling said valve stem and free of attachment thereto, and means connected to said cranked shaft and adapted to cause movement thereof whereby said valve will be lifted off the valve seat.

4. As an article of manufacture, a valve having a projecting stem part, a valve seat, resilient means normally urging said valve into sealing engagement with said seat, a housing member adapted to surround said projecting valve stem part, a ledge formed in said housing, an opening in the housing diametrically opposite said ledge, a Y-shaped lift member insertable through said opening into engagement with said ledge and adapted to operatively engage said projecting valve stem part, and a cranked shaft journaled in said housing and supporting the leg of said Y-shaped lift member, said lift member being free of attachment to adjacent parts whereby it may shift relative to the adjacent parts.

5. As an article of manufacture, a valve having a projecting stem part, a valve seat, resilient means normally urging said valve into sealing engagement with said seat, a housing member adapted to surround said projecting valve stem part, a ledge formed in said housing, an opening in the housing diametrically opposite said ledge, a Y-shaped lift member insertable through said opening into engagement with said ledge and adapted to operatively engage said projecting valve stem part, a cranked shaft journaled in said housing and supporting the leg of said Y-shaped lift member, said lift member being free of any attachment to adjacent parts whereby it may shift relative to the adjacent parts, and a cap closing said opening and retaining said cranked shaft and lift member in position against excessive shifting within the housing.

6. In a safety valve adapted to be secured to a pressure vessel, the combination of a valve body having a valve seat, a valve resiliently urged onto said valve seat, a projecting valve stem, a housing surrounding said projecting valve stem, an opening formed in the side of said housing, a cap closing said opening, a cranked shaft journaled in said housing and retained in position by said cap, a ledge formed on the inside of said housing diametrically opposite to said opening, a Y-shaped lift member disposed in the housing with the arm and leg extremities engaging said ledge and cranked shaft respectively, and having the arms straddling said valve stem and engageable with a part thereof, said cranked shaft and Y-shaped lift member being insertable into and removable from said housing through said opening with said valve remaining seated.

CLYDE H. FOLMSBEE.

REFERENCES CITED

The following references are of record in the file of this patent:

UNITED STATES PATENTS

| Number | Name | Date |
| --- | --- | --- |
| 143,644 | Smith | Oct. 14, 1873 |
| 415,469 | Porter | Nov. 19, 1889 |
| 440,315 | Lohbiller | Nov. 11, 1890 |
| 593,476 | Kennedy | Nov. 9, 1897 |
| 1,718,730 | Brown | June 25, 1929 |
| 1,877,859 | Hansen | Sept. 20, 1932 |
| 1,974,274 | Hopkins | Sept. 18, 1934 |
| 1,976,573 | Pierce | Oct. 9, 1934 |
| 1,984,770 | Sorensen | Dec. 18, 1934 |
| 2,086,942 | Mandeville | July 13, 1937 |
| 2,320,339 | Buttner | June 1, 1943 |